J. M. WASHBURN.
HOLDER FOR CARDS, PICTURES, AND THE LIKE.
APPLICATION FILED JUNE 17, 1911.
1,040,067.
Patented Oct. 1, 1912.
2 SHEETS—SHEET 1.
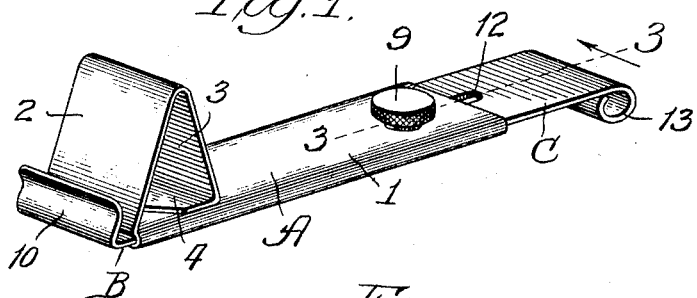
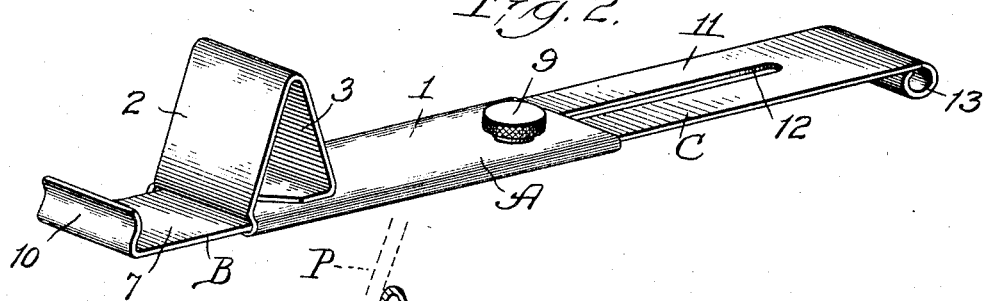
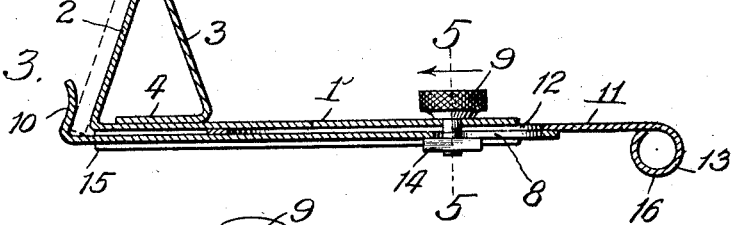
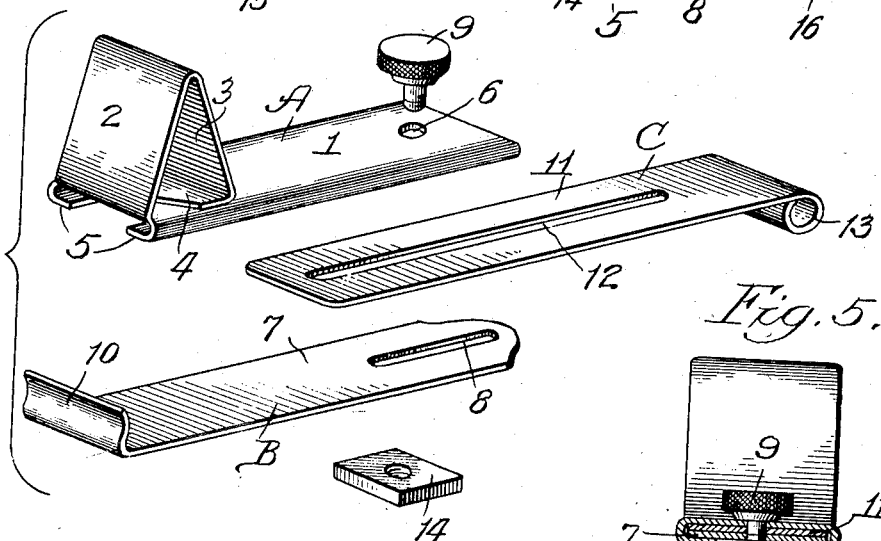
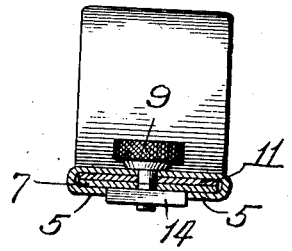
Witnesses:
John Endere
A. A. Thomas
Inventor:
James Murray Washburn,
by Wallace R. Lane
Atty.

J. M. WASHBURN.
HOLDER FOR CARDS, PICTURES, AND THE LIKE.
APPLICATION FILED JUNE 17, 1911.
1,040,067.
Patented Oct. 1, 1912.
2 SHEETS—SHEET 2.
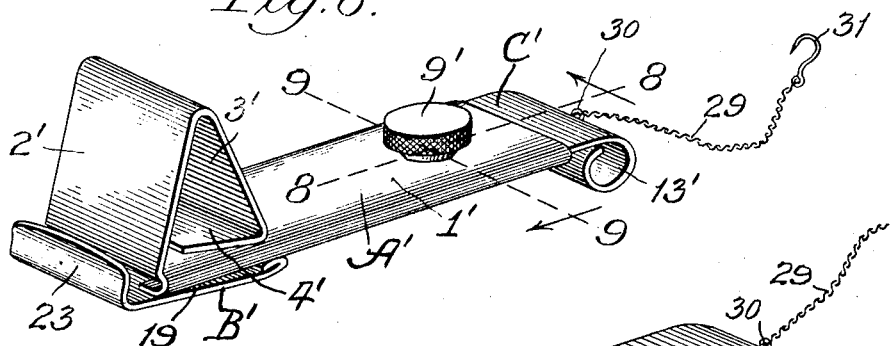
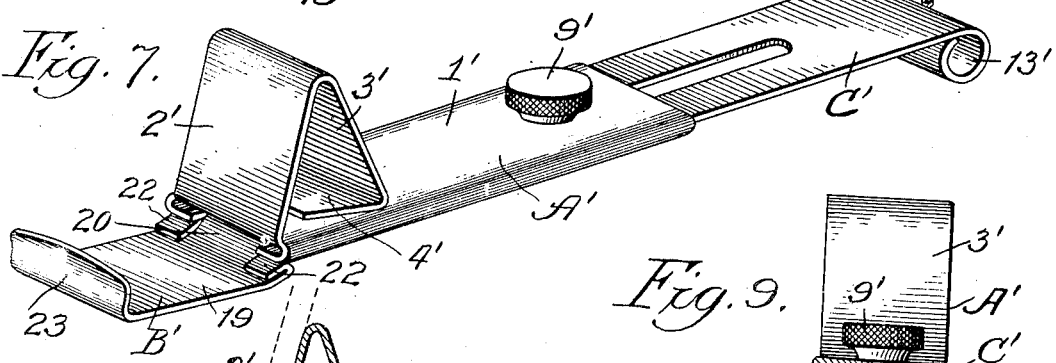
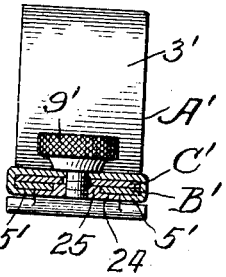
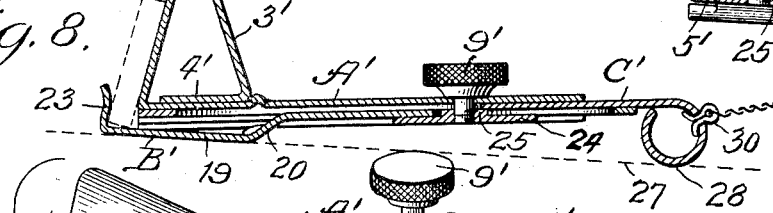
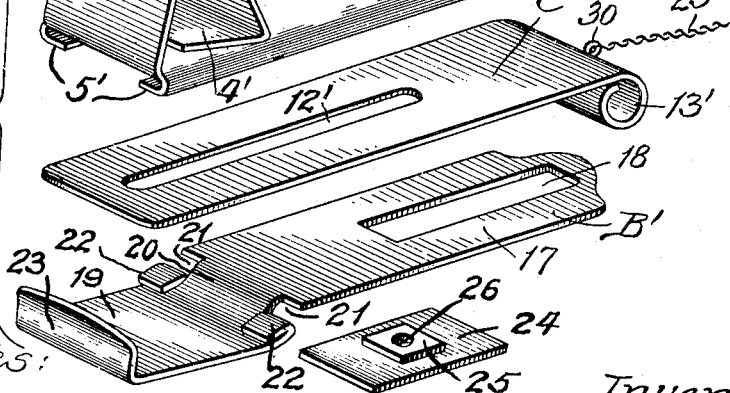
Witnesses:
John Enders
A. A. Thomas
Inventor:
James Murray Washburn,
by Wallace R. Lane
Atty.

UNITED STATES PATENT OFFICE.

JAMES MURRAY WASHBURN, OF CHICAGO, ILLINOIS.

HOLDER FOR CARDS, PICTURES, AND THE LIKE.

1,040,067.  Specification of Letters Patent.  Patented Oct. 1, 1912.

Application filed June 17, 1911. Serial No. 633,857.

*To all whom it may concern:*

Be it known that I, JAMES MURRAY WASHBURN, a citizen of the United States, residing at Chicago, in the county of Cook and State of Illinois, have invented a new and useful Improvement in Holders for Cards, Pictures, and the Like, of which the following is a specification.

My invention relates to holders for such articles as cards, pictures and the like, and has for its object the provision of a holder which is constructed of sheet metal and has readily adjustable parts for sustaining objects of different heights and thicknesses in substantially upright position without danger of their toppling over.

Broadly considered, the holder of my invention comprises a horizontally adjustable holding portion at the front end for receiving and sustaining the desired article in substantially upright position and a horizontally extensible base portion to vary the effective base length of the holder in accordance with the size of the supported article.

In the accompanying drawings which show two forms of holder embodying my invention, Figure 1 is a perspective view of one form of holder; Fig. 2 is a view similar to Fig. 1 showing the front and rear members in extended position; Fig. 3 is a longitudinal view in cross section on line 3—3 of Fig. 1; Fig. 4 is a perspective view of the various parts of my holder in disassembled relation to show more clearly the structural form of each part; Fig. 5 is a transverse cross-section on line 5—5 of Fig. 3; Fig. 6 is a perspective view of a modified form of holder; Fig. 7 is a view similar to Fig. 6 showing the front and rear members in extended position; Fig. 8 is a longitudinal cross-section on line 8—8 of Fig. 6; Fig. 9 is a transverse cross-section on line 9—9 of Fig. 6; and Fig. 10 is a perspective view showing the different parts of the holder in disassembled relation for the sake of clearness.

I will first take up the description of the form shown in Figs. 1 to 5 inclusive. The three parts or members which comprise the holder are, as a whole, indicated by A, B and C—A being the central member, B the front member which coöperates with the central member to sustain the desired article in upright position, and C being the rear or base member. Each of these parts or members is formed of sheet metal. The central member A comprises a horizontal body section 1 from the front end of which the metal is turned upwardly and rearwardly at 2, then downwardly and rearwardly at 3 and then forwardly at 4 over the body section 1. The portions 2, 3 and 4 may broadly be referred to as an upright supporting extension on the central member A. At the sides the central member A is turned downwardly and inwardly to form a pair of guide flanges 5 between which the front member B and rear member C are adapted to slide, as will presently be explained. An opening 6 is provided on the body section 1 to accommodate the clamping screw for holding the parts in adjusted position. The front member B has a body section 7 adapted to engage the flanges 5 of the central member A and thereby has a slidable connection with this member. At its rear end the member B is provided with a longitudinal central slot 8 through which the clamping screw 9 passes. At its front end the member B is provided with an upturned lip 10 which coöperates with the supporting extension on the central member A to sustain the desired article in substantially upright position, as indicated in dotted lines at P in Fig. 3. The article P may be a card, picture, book or the like. It will be seen from Fig. 3 that the lower front edge of the article P bears against the upturned lip, the article leaning bodily against the upwardly and rearwardly extending portion 2 of the central member. The rear or base member C consists of a body section 11 provided with a central longitudinal slot 12. The rear end of the member C is turned down to form a tubular bearing flange 13. The body section 11 is adapted to slide between the guide flanges 5 on the central member A. The space between the flanges 5 and the body section of the central member A is sufficient to slidably accommodate the body sections 7 and 11 of the front and rear members, as clearly shown in Fig. 5. The clamping screw 9 projects through the opening 6 in the central member A, through the slot 12 in the rear member C and through the slot 8 in the front member B. The lower end of the screw engages a nut 14 which fits snugly between the flanges 5, as shown in Fig. 5 and is thereby held against rotation when the screw is tightened or loosened. The front bearing point of the holder, as shown in Figs. 1 to 5, inclusive, is at 15, while the rear bearing point is at 16 on the flange 13. If desired, however, the lip 10 may be extended downwardly at the bottom to provide the front bearing point of the holder.

It will be seen from the above that my new form of holder is readily adjustable at the front to accommodate articles of different thickness and is also adjustable at the rear to vary the effective base length in order to provide the proper amount of stability for the supported article.

In the modification shown in Figs. 6 to 10 inclusive, the front member is formed differently from the front member of the form shown in Figs. 1 to 5 inclusive, otherwise there is no difference between the two forms of holders. In the modified form of holder, the front member B' consists of a body section 17 having a central longitudinal slot 18 at the rear and an extension 19 at the front. This extension is formed by bending the metal downwardly at 20 and cutting the metal away at the points 21 on either side of the neck portion 20. The metal thus cut away is preferably bent forwardly over the extension 19, as indicated at 22. At the front end the extension 19 is bent upwardly to form the lip 23. The body section 17 is adapted to engage the longitudinal flanges 5' formed on the central member A'. As the extension 19 is offset downwardly with respect to the body section 17, the latter may be slid inwardly without interference by the extension. The turned-down lugs 22 may engage the under side of the flanges 5' and thus form bearing points between the central member A' and the front member B'. However, it is to be understood that these bearing points between the flanges 5' of the central member A' and the front member B' are not necessary, and that the turned-down lugs 22 may be entirely omitted if desired. The central member A', like the central member A of the form described first, is turned upwardly and rearwardly at 2', then downwardly and rearwardly at 3' and then forwardly at 4' over the body section 1'. The rear member C', like the member C of the first form, is provided with a longitudinal slot 12' and with a downwardly turned bearing flange 13' at the rear end. The screw 9' is adapted to extend through the opening 6' in the central member A' and through the alined slots 12' and 18. The lower end of the screw 9' engages a nut which consists of a small rectangular plate 24 having a boss 25 formed thereon. The screw-threaded opening 26 formed on the parts 24 and 25 of the nut receives the free end of the screw 9'. The plate portion 24 of the nut fits snugly between the flanges 5', as shown in Fig. 9, while the boss 25 fits into the slot 18 of the central member B'. In this way a deep bearing surface for the screw 9 is provided without the necessity of projecting the free end of the screw beyond the nut. As seen from Fig. 9, the plate portion 24 of the nut is flush with the flanges 5'. By loosening the screw the front and rear members of the holder may be extended into the proper position, whereupon the nut is tightened to firmly clamp the parts in adjusted position. By reference to Fig. 8 it will be observed that the lower surface of the extension 19 lies in the base line or plane 27 which also touches the bearing flange 13' at the bearing point 28. No matter what position the front member B' is in, the holder will always rest at the front on the flat lower surface of the extension 19, while the rear bearing point of the holder is at 28. No part of the holder between the extension 19 and the bearing point 28 touches the bearing plane 27 which may be considered to be the top of a table, bureau, shelf or the like. The extension 19 and the flange 13' being of smooth metal, there is no liability of the supporting surface underneath becoming scratched by the metal of the holder. Furthermore, the broad bearing surface afforded by the extension 19 imparts to the holder an unusual amount of stability. The adjustability of the front member B' permits articles of different thickness to be supported on the holder—articles which may vary in thickness from that of an ordinary photograph to an inch or more. It will be observed from Fig. 8 that the body sections of the three members incline downwardly in a forward direction. It is, therefore, necessary to first swing the holder bodily about the rear flange 13' until the body sections are in substantially horizontal position, before there is any real danger of the supported article tipping over backwardly. In order to prevent the supported article from accidentally tipping over in a forward direction, I provide a suitable connecting member 29 which is shown for the sake of illustration in the form of a small chain. One end of this chain is attached to the rear of the base member C' in any suitable manner, as by means of a cotter pin 30 passing through an opening in the flange 13'. The free end of the chain 29 is provided with a sharp pointed hook 31 which is adapted to be stuck into the back of the supported picture or card. In this way the article becomes anchored to the rear of the base and is thus held against being accidentally tipped over toward the front.

It is, of course, obvious that the connecting member 29 may take other forms besides that of a chain, but because of its lightness, cheapness and flexibility, I prefer the connecting member 29 in the form of a chain.

It is to be understood that the form of holder shown in Figs. 1 to 5 inclusive may be provided with the chain 29.

While I have herein described certain specific forms of holder embodying my invention, I would have it understood that I do not limit myself to the exact construction shown, since changes and alterations may occur to those skilled in the art without departing from the scope of my invention as defined in the appended claims.

Having thus described my invention what I claim as new and desire to secure by Letters Patent of the United States is:

1. A sheet metal holder of the class described, comprising a central member having a horizontal body section provided with longitudinal guide flanges on the bottom side, an upright supporting extension formed at the front end of the body section, the metal of the extension being first bent upwardly and rearwardly, then downwardly and rearwardly, then forwardly over the body section, a front member consisting of a flat base section offset to form a bearing surface, and an extension slidably engaging said flanges, said base section having an upturned lip at the front to engage the lower edge of the supported article, a rear member slidably engaging said flanges and provided at its rear end with a downwardly turned bearing flange, the holder resting on the flat base section at the front and on said bearing flange at the rear.

2. A sheet metal holder of the class described, comprising a central member having an upright supporting extension formed at its front end, a front member in slidable engagement with said central member, said front member having an upturned lip which coöperates with said upright extension to support the desired article in substantially upright position, a base member slidably connected with said central member to vary the effective base length of the holder and a single clamping means passed through all of said members and holding them in adjusted relation.

3. In a sheet metal holder of the class described, comprising a central member having a horizontal body section provided with longitudinal guide flanges, an upright supporting extension formed at the front end of the body section, the metal of said extension being first bent upwardly and rearwardly, then downwardly and rearwardly, then forwardly over the body section, a front member in slidable engagement with the flanges of said central member, said front member being provided with a longitudinal slot at the rear and with an upturned lip at the front, said lip coöperating with said upright extension to support the desired article, a slotted rear member slidably engaging the flanges of the central member and provided at its rear end with a downwardly turned flange which forms the rear bearing point of the holder, a screw passing through said central member and the slots in the other members, and a nut at the end of said screw for clamping the front and rear members in adjusted position.

4. A sheet metal holder of the class described, comprising a central member having a horizontal body section and an upright supporting section formed at the front end thereof, a front member in slidable engagement with said central member, said front member being provided with a longitudinal slot at the rear and with an upturned lip at the front, said lip coöperating with said upright extension to support the desired article in substantially upright position, a slotted rear member slidably engaging said central member and provided at its rear with a downwardly turned flange which forms the rear bearing point of the holder, a screw passing through said central member and the slots in the other members, and a nut at the end of said screw for clamping the front and rear members in adjusted position.

5. A sheet metal holder of the class described, comprising a member having a base and an upright supporting extension formed at its front end, said extension being bent backward on itself into contact with said base to stiffen the structure, and a second member in slidable engagement with said first member, said second member being provided with an upturned lip at the front for coöperating with said upright extension to support the desired article in substantially upright position, said lip being adjustable toward and away from said extension to accommodate articles of different thicknesses and a clamping device for holding the second member in adjusted position.

6. A sheet metal holder of the class described, comprising a horizontally adjustable holding portion for receiving and sustaining the desired article in substantially upright position, a base portion horizontally extensible with respect to said article, and a connecting member secured at one end to the rear of said extensible base portion and at the other end provided with means for attachment to the supported article to prevent accidental forward tilting thereof.

7. A sheet metal holder of the class described, comprising a central member having an upright supporting extension formed at its front end, a front member in slidable engagement with said central member, said front member having an upturned lip which coöperates with said upright extension to support the desired article in substantially upright position, a base member slidably connected with said central member to vary the effective base length of the holder, and a flexible connecting member secured at one end to the rear of said base member and at the other end provided with means for attachment to the supported article to prevent accidental forward tilting thereof.

8. A sheet metal holder of the class described, comprising a horizontally adjustable holding portion at the front end for receiving and sustaining the desired article in substantially upright position, said holding portion including a flat base section offset to rest upon the supporting surface underneath, and a horizontally disposed and extensible base member provided at the rear with a downwardly turned bearing flange, the holder resting entirely upon said flat base section at the front and said flange at the rear.

9. A sheet metal holder of the class described, comprising a central member having an upright supporting extension formed at its front end, a front member in slidable engagement with said central member, said front member including a flat base section offset with respect to said central member provided at the front with an upturned lip which coöperates with said upright extension to support the desired article in substantially upright position, a base member slidably connected with said central member to vary the effective base length of the holder, and a downwardly-turned flange at the rear of said base member, said flat base section and said flange forming the sole bearing points of the holder on the supporting surface underneath.

10. A sheet metal holder for cards, pictures and the like, consisting of a holding member and a base member, said holding member comprising a horizontal body section of sheet metal bent at its front end to form a holding portion for receiving and sustaining the desired article in substantially upright position, said body section being provided with longitudinal flanges adapted to be slidably engaged by said base member, so that the effective base length of the holder may be readily varied, and a flexible connecting member secured at one end to the rear end of said base member and at the other end provided with means for attachment to the supported article to prevent accidental forward tilting thereof.

In witness whereof, I hereunto subscribe my name this 18th day of May, A. D. 1911.

JAMES MURRAY WASHBURN.

Witnesses:
   A. A. THOMAS,
   M. H. DOOLEY.